United States Patent [19]
Rode

[11] Patent Number: 5,982,562
[45] Date of Patent: Nov. 9, 1999

[54] LENSES FORMED BY ARRAYS OF REFLECTORS

[75] Inventor: Andrei Vladimirovich Rode, Capital Territory, Australia

[73] Assignee: The Australian National University of Acton, Australia

[21] Appl. No.: 08/750,176

[22] PCT Filed: May 31, 1995

[86] PCT No.: PCT/AU95/00326

§ 371 Date: Apr. 7, 1997

§ 102(e) Date: Apr. 7, 1997

[87] PCT Pub. No.: WO95/33220

PCT Pub. Date: Dec. 7, 1995

[30] Foreign Application Priority Data

May 31, 1994 [AU] Australia ................................. PM5977

[51] Int. Cl.[6] .................................................. G02B 17/00
[52] U.S. Cl. ................. 359/726; 359/625; 359/592; 359/595; 359/596
[58] Field of Search ......................... 559/620, 621, 559/625, 627, 628, 619, 592, 593, 595, 596, 597, 741, 742, 743, 851, 852, 726

[56] References Cited

U.S. PATENT DOCUMENTS

| | | |
|---|---|---|
| 1,193,999 | 8/1916 | Dixon ........................................ 455/605 |
| 3,322,032 | 5/1967 | Leach . |
| 3,425,056 | 1/1969 | Dawson ..................................... 359/628 |
| 3,543,024 | 11/1970 | Kantor . |
| 4,022,186 | 5/1977 | Northrup, Jr. ............................. 126/683 |
| 4,312,329 | 1/1982 | Carver et al. ............................. 126/439 |
| 5,532,884 | 7/1996 | Lee et al. ................................. 359/833 |

FOREIGN PATENT DOCUMENTS

| | | |
|---|---|---|
| 2382651 | 9/1978 | France . |
| WO9107681 | 5/1991 | WIPO . |
| WO9406046 | 3/1994 | WIPO . |

*Primary Examiner*—Georgia Epps
*Assistant Examiner*—Jordan M. Schwartz
*Attorney, Agent, or Firm*—Sughrue, Mion, Zinn, Macpeak & Seas, PLLC

[57] ABSTRACT

A lens, suitable for directing radiation, comprises an array of planar reflecting elements or slats. Each reflecting element is of non-uniform extent or surface area t and/or is of non-uniformly spacing d from adjacent elements. The elements may be parallel or non-parallel. Each element is positioned such that the ratio of spacing $d_n$ to extent $t_n$ is determined by the angle of incidence on the nth element $\gamma_n$ as is given by the relationship (a) where $d_n$ is the spacing between the nth and (n+1)th adjacent elements of the lens, $t_n$ is the length of the nth element and M is the magnification of the lens.

14 Claims, 12 Drawing Sheets

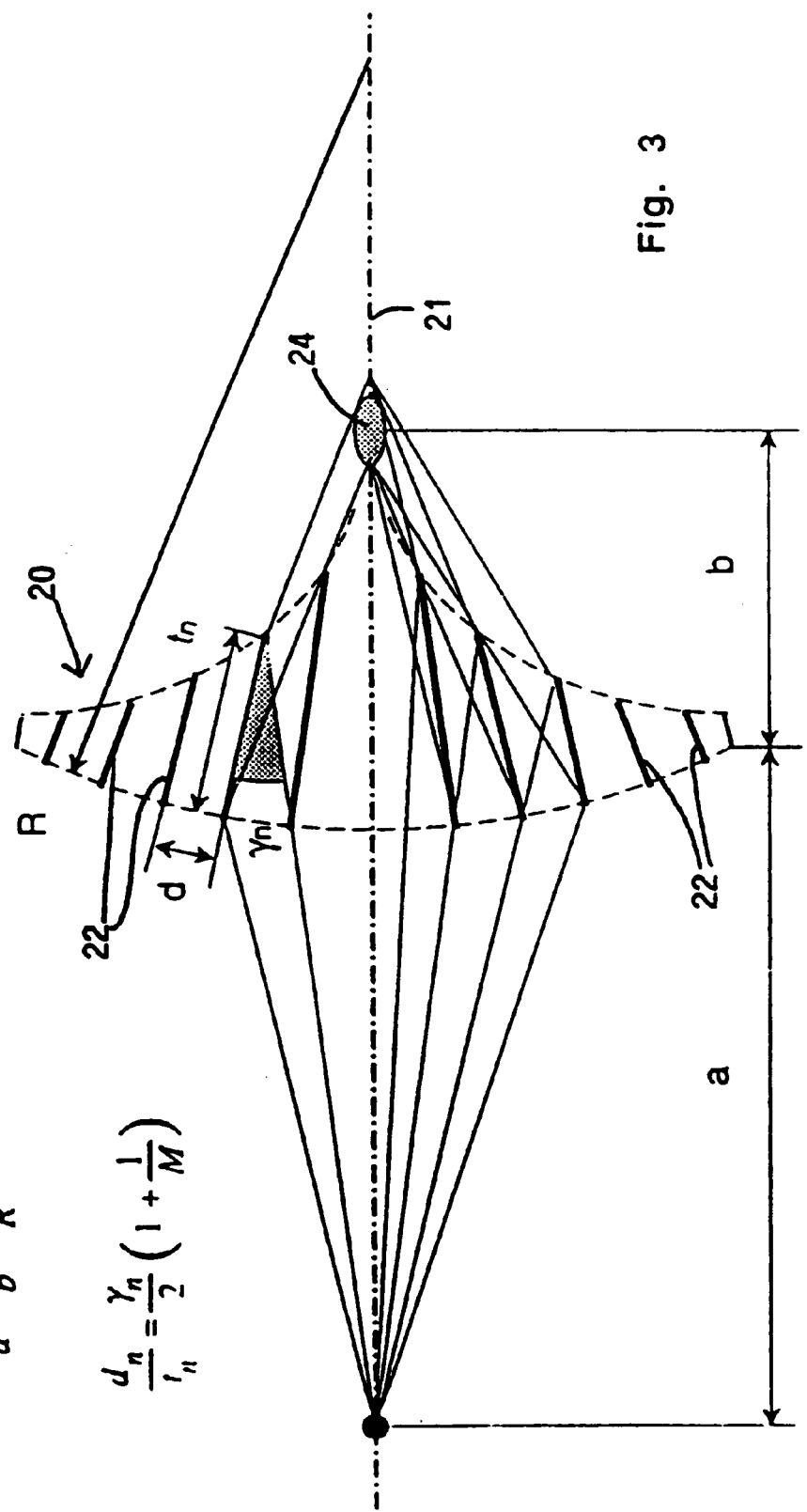

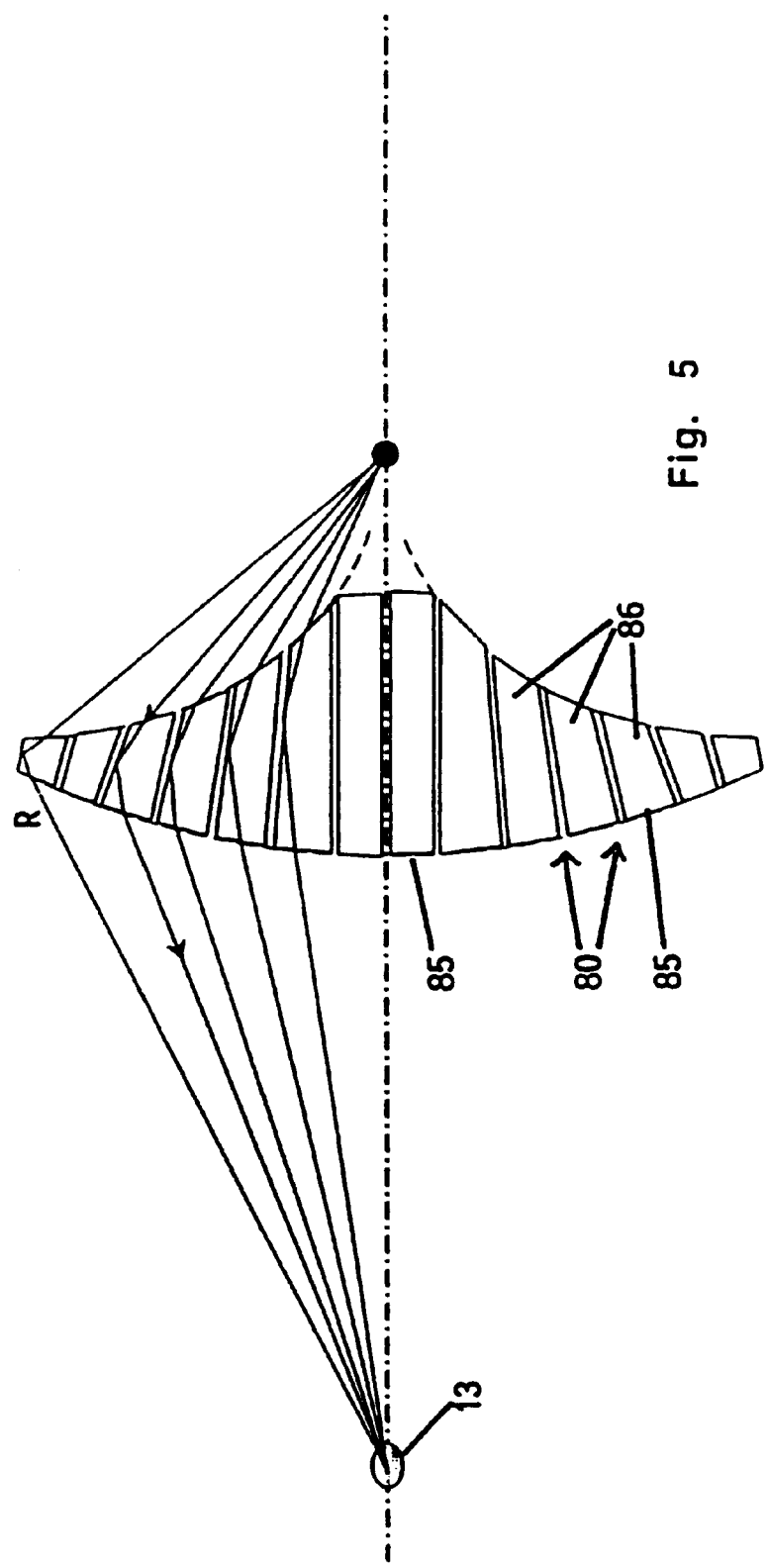

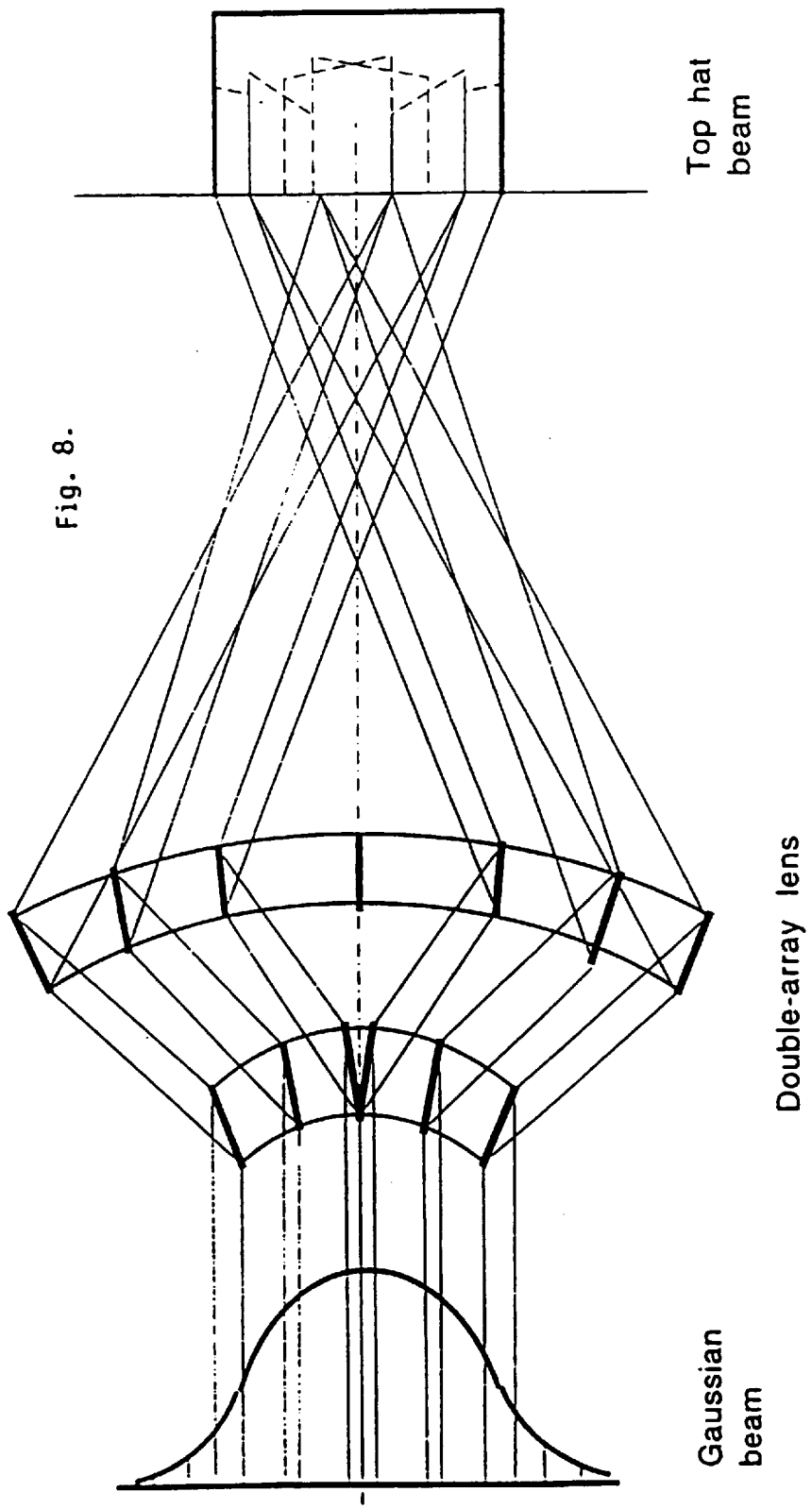

light-shaft

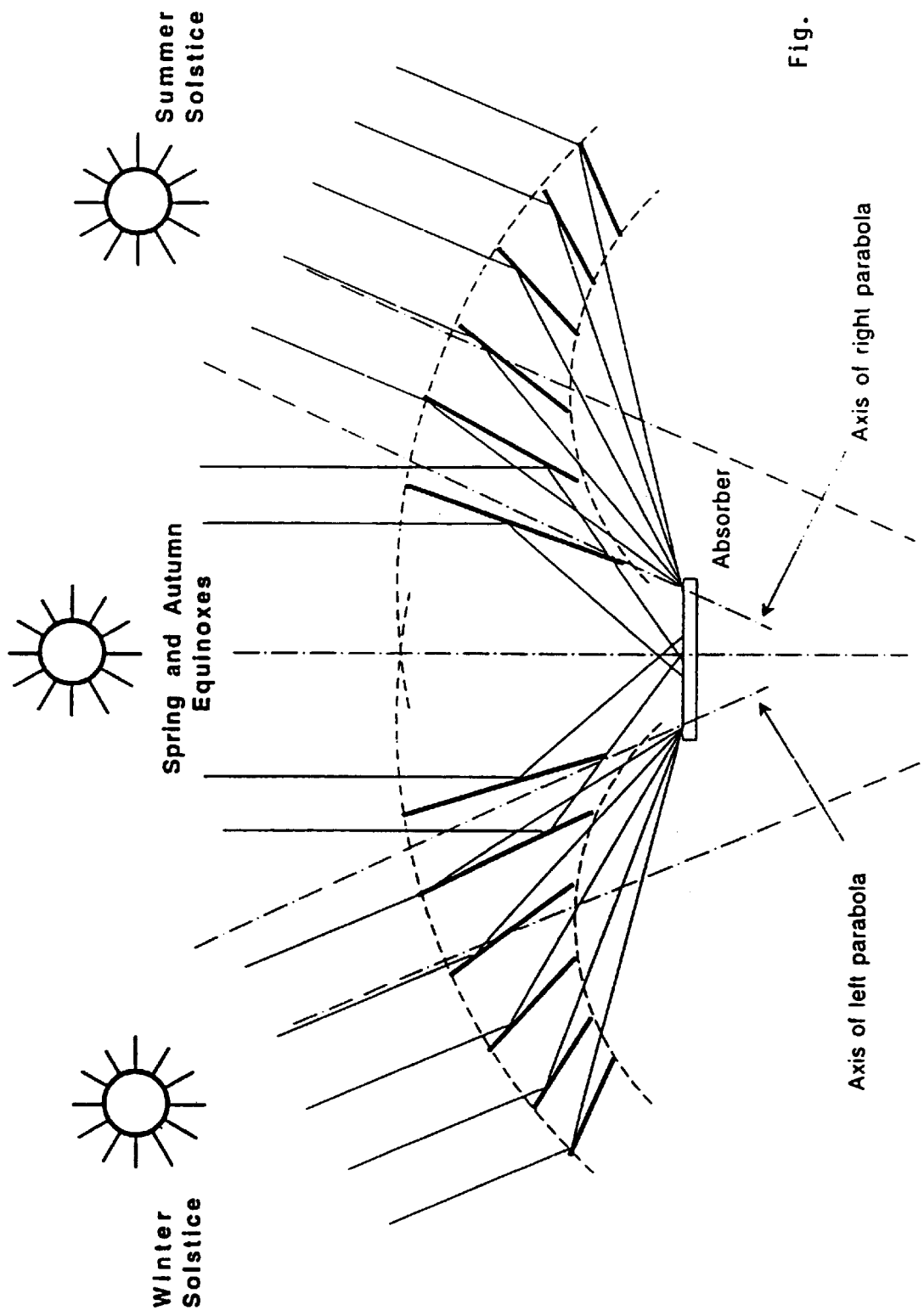

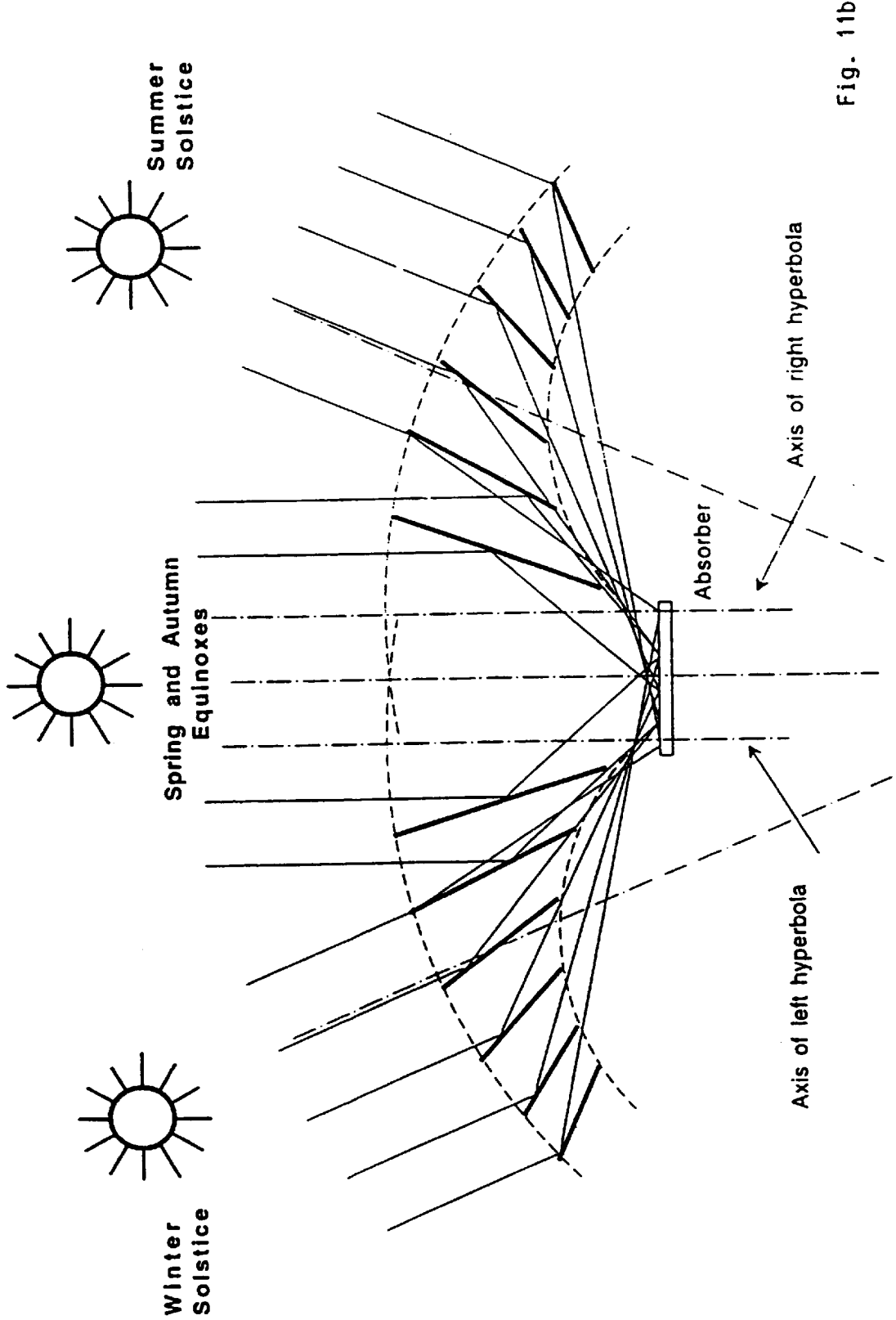

LENSES FORMED BY ARRAYS OF REFLECTORS

TECHNICAL FIELD

This invention concerns optical elements for use as lenses, collimators and collectors of radiation. More particularly, it concerns lenses formed by arrays of reflecting slats, which are suitable for focusing, collimating, or collecting radiation.

BACKGROUND TO THE INVENTION

The specification of International patent application No PCT/AU93/00453 discloses a range of radiation control devices (including radiation deflectors, concentrators and lenses), each of which is formed by an array of substantially identical reflecting elements. In addition, it is noted in the specification of International patent application No PCT/AU93/00453 that an array of elongate reflectors can be used for one-dimensional focusing (line focusing) of radiation, and that two such arrays of reflectors, crossed at right angles, will form the equivalent of an array of reflecting channels, with each channel having a rectangular cross-section (which is a square cross-section when the reflectors of each array of parallel reflectors have the same spacing). Thus a two-dimensional focusing array or lens can be constructed using two arrays of reflector strips or slats.

One advantage possessed by optical devices formed by an array of reflecting slats—including the "90° crossed-slats" lens referred to above—is that the surfaces of the elongate reflectors can be polished and examined for flaws before the arrays of reflectors are assembled to form the optical device. This feature, as also noted in the specification of International patent application No PCT/AU93/00453, permits the reflective surfaces of the slats to be coated in a manner which ensures that those surfaces are selectively reflective at predetermined wavelengths.

The present inventor has also shown that this type of 90° crossed-slats lens has an additional advantage over the devices previously used to focus x-radiation (and other radiation having a wave-like character) onto a focal zone. The additional advantage is a significant increase in the "intensity gain" of the lens or focusing device. In this field, the gain, G. of a lens or focusing device is defined by the relationship:

$$G = \frac{I_d}{I_o}$$

where $I_d$ is the intensity of radiation in the focal spot or zone of the device and $I_o$ is the intensity of radiation at the same location in the absence of the focusing device.

DISCLOSURE OF THE PRESENT INVENTION

In further developmental work with slatted lenses and crossed-slats lenses, the present inventor has ascertained that improved slatted lenses with a focussing efficiency approaching 100% can be produced if the individual reflectors or slats of the lens are not essentially the same as each other, but the slats have a progressive change in surface area as the distance of the slats from the axis of the lens increases. The lenses are preferably produced such that, (i) the slats are planar, and (ii) the change in surface area of the slats with distance from the axis of the lens will be a decrease in surface area. However, in the manufacture of such lenses, the slats of a lens may conveniently be in groups of equal "front-to-back" length, t, but with varying spacing, d, between the slats in a group, such that the ratio of $d_n/t_n$ is determined by the angle of incidence, on the nth slat of the lens, of radiation from a point source on the lens axis, $\gamma_n$, as is approximately given by the relationship:

$$\gamma_n \simeq \frac{d_n}{t_n}$$

for a magnification of one,
and, perhaps more precisely given by:

$$\frac{d_n}{t_n} = \frac{\gamma_n}{2}\left(1 + \frac{1}{M}\right)$$

where $d_n$ is the separation (or spacing) between the nth and (n+1)th slats of the lens, $t_n$ is the extent of the nth slat in a direction parallel to the lens axis, and, M is the magnification of the lens.

Preferably, the separation of the slats of the lens (that is, the spacing—or average spacing—between adjacent slats of the lens) will be such that no slat or reflector creates a "shadow" on its adjacent outer reflector in the lens, from radiation from a point source at an expected point on the axis of the lens. This usually means that the spacing, d, between adjacent slats will increase progressively with the distance of the slat from the axis of the lens, and the possibility of multiple reflections of radiant energy from that source, in the space between adjacent slats, will be minimised. In the case of a focusing lens, this will maximise the energy focused by the lens, which will further increase the gain of the lens.

Thus, according to the present invention, there is provided an improved slatted lens which comprises a plurality of spaced-apart slats disposed symmetrically about the axis of the lens, each slat having one face which is towards the axis of the lens, said one face having a reflective surface, characterised in that the relationship between (i) the length, t, of a slat (ii) the spacing, d, between adjacent slats, and (iii) the angle of incidence, $\gamma$, of radiation from a point source on the axis of the lens, for the nth slat from the lens axis, is given by $$\frac{d_n}{t_n} = \frac{\gamma_n}{2}\left(1 + \frac{1}{M}\right)$$

Although this definition of the new slatted lens of the present invention requires only one face of each slat to have a reflective surface, in many instances (for example, if the lens is to be used with an extended source of radiation, or for concentrating partially diffused radiation) it will be preferable for both faces of each slat to have a reflective surface.

The generatrix (i.e. a line normal to each of the reflectors) of a lens with plane reflectors (slats) may have (i) a parabolic shape when the lens is to be used to focus a parallel beam, or to produce a collimated beam from a point source, (ii) an elliptical shape to focus a converging beam, or to produce a diverging beam from a point source, or (iii) a hyperbolic shape to focus a diverging beam, particularly a convex hyperbolic shape to achieve a higher intensity gain in the focal spot (demagnification), or a concave hyperbolic shape for magnification. In narrow angle lenses the generatrix will typically have the shape of part of a circular cylinder, as a parabola, a hyperbola or an ellipse all approximate to a circle for small off-axis angles.

If the envelope of the leading edges or the trailing edges of the slats of the slatted lens is substantially a plane which is orthogonal to the axis of the lens, two such slatted lenses may be placed with their substantially planar slat edges closely adjacent to each other (preferably abutting each other) and with their slats "crossed at 90°", to form an improved crossed-slats lens wherein the two one-dimensional lenses have a common centre of curvature. As will be understood to persons skilled in the art, a lens of this type is described above and in the specification of International patent application No PCT/AU93/00453, the details of such specification of which should be considered to be entirely incorporated herein by the reference thereto.

In one broad form, the present invention provides a lens, suitable for directing radiation, comprising an array of planar reflecting elements, characterised in that each of said elements are of non-uniform extent or surface area and/or are non-uniformly spaced from adjacent elements.

Preferably, the surface area of each element decreases relative to adjacent elements, as the distance of each element from an axis of said lens increases.

Alternatively, but also preferably the spacing between each element increases as the distance of each element from an axis of said lens increases, whilst the extent of each element remains the same.

In a preferred form, each element is spaced and/or has a surface area such that no element creates a shadow on an adjacent element positioned outwardly thereof.

Preferably, the ratio of $d_n/t_n$ is determined by angle of incidence $\gamma_n$ of radiation on each element of said lens as is given by the relationship:

$$\frac{d_n}{t_n} \simeq \gamma_n$$

where $d_n$ is the spacing between the nth and (n+1)th adjacent elements of the lens, and $t_n$ is the length of the nth element.

Most preferably, the ratio of $d_n/t_n$ is determined by the angle of incidence $\gamma_n$ of radiation on each element of said lens as is given by the relationship:

$$\frac{d_n}{t_n} = \frac{\gamma_n}{2}\left(1 + \frac{1}{M}\right)$$

where $d_n$ is the spacing between the nth and (n+1)th adjacent elements of the lens, $t_n$ is the length of the nth element, and M is the magnification of the lens.

In a preferred form, either one or both faces of the element is provided with a reflective surface.

Preferably, the generatrix of the lens is of simple or compound, hyperbolic (concave hyperbolic or convex hyperbolic), parabolic, elliptic or circular shape.

In a preferred form a cross-slatted lens is formed of two lenses as hereinbefore described, wherein their respective elements are placed with their substantially planar edges closely adjacent to each other (preferably abutting each other) and with their elements 'crossed at 90°', the two lenses having a common centre of curvature.

Most preferably, the cross-slatted lens forms an improved cross-slatted lens as disclosed in the specification of PCT/AU93/00453.

Preferably, said reflective elements are formed as planar slots in transparent material and whereby reflection is due to total internal reflection.

In an alternatively preferred form, said reflective elements are crystals or multi-layer mirrors and reflection is due to Bragg reflection.

In another preferred form, a multi-lens is formed of two lenses as hereinbefore described wherein said multi-lens is used as a beam profile homogeniser to arrange a first type of beam into a second type of beam.

In a preferred embodiment, said lens is utilised as a sky-light enhancer.

In another preferred embodiment, said lens is utilised as a solar concentrator, in the form of a simple or compound hyperbolic shape.

These and other features of the present invention will be better understood from the following description of embodiments of the present invention, which are provided by way of example only. In the following description, reference will be made to the accompanying drawings.

BRIEF DESCRIPTION OF THE ACCOMPANYING DRAWINGS

FIG. 3 is a representation, similar to that of FIG. 1, of another modified form of the slatted lens shown in FIG. 1, having a magnification which is greater than 1 or less than 1 (depending on the way in which the lens is used);

FIG. 5 illustrates a lens similar to that in FIG. 3, but with the reflectors formed as planar slats in a transparent material with refractive index greater than 1, and reflection is due to total internal reflection;

FIG. 8 illustrates an example of an array designed as a beam profile homogeniser to arrange a Gaussian beam into a 'top hat' beam;

FIG. 11 illustrates, in FIGS. 11(a) and 11(b) an elevational cross-sectional views of compound hyperbolic concentrators.

DETAILED DESCRIPTION OF THE ILLUSTRATED EMBODIMENTS

Figure 1:
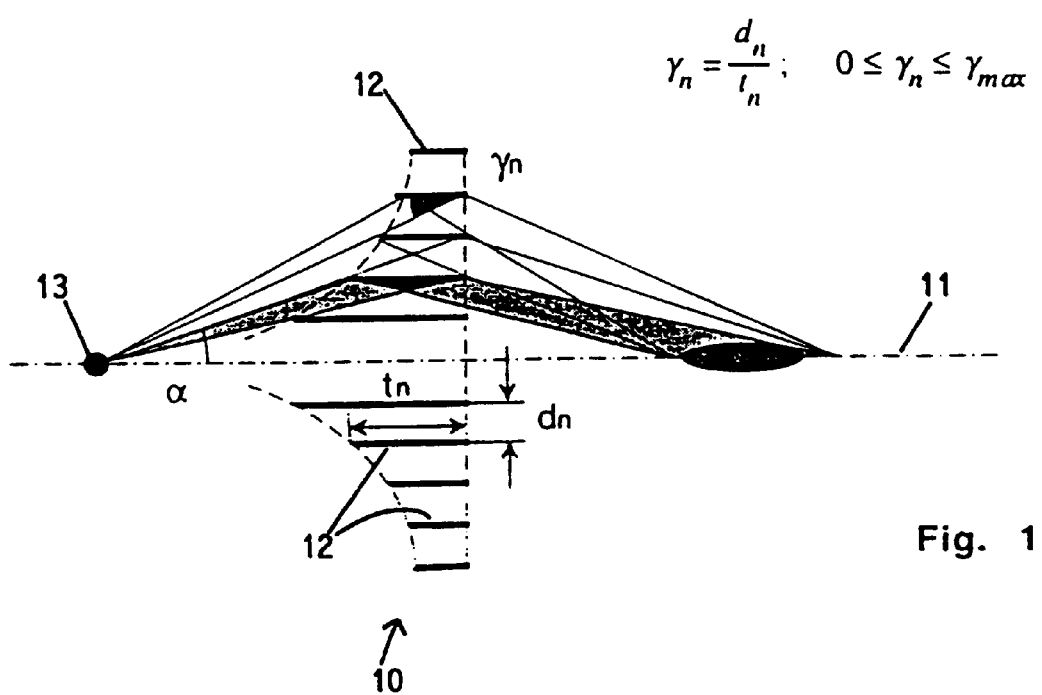
FIG. 1 is schematic sectional representation of a slatted lens having planar reflectors and having a magnification of 1, constructed in accordance with the present invention.

FIG. 1 is a sectional view of a slatted lens 10 having a plurality of planar slats 12 mounted symmetrically above and below the axis 11 of the lens. The face of each slat 12 which is towards the axis 11 has a reflective surface. The other face of each slat 12 may also have a reflective surface. Normally, each slat 12 will extend the same distance in the plane orthogonal to the drawing, as each other slat in the array. A point source 13 of radiation is positioned on the axis of the lens 10. As shown by a series of ray paths, the lens 10 acts to focus radiation from the source 13 onto a focal zone 14, which will be an elongate or line focal zone, extending in a direction orthogonal to the plane of FIG. 1.

For the sake of clarity, FIG. 1 shows only five reflectors or slats on each side of the lens axis 11. In practice, many more reflective slats will normally be used to produce a slatted lens, particularly if the source 13 is a source of x-rays. A similar comment applies to the illustrated lenses in the other Figures of the accompanying drawings.

It will be noted that in the lens featured in FIG. 1, the slats 12 which are closest to the lens axis 11 have a greater surface area than the slats 12 which are remote from the lens axis 11, and that there is a progressive change in the surface area of the slats with the distance of a slat from the lens axis 11. In addition, the spacing between the slats 12 which are remote from the lens axis 11 is greater than the separation of the slats which are adjacent to the lens axis. These dimensional changes are chosen to ensure that (i) all radiation from the source 13 which is incident on the lens 10 is reflected towards the focal zone 14 by a reflective surface of a slat 12 of the lens, and (ii) no radiation from the source 13 is reflected more than once in its passage through a channel between two adjacent slats of the lens. Thus essentially all radiation from the source 13 which is incident upon the slatted lens 10 is directed to the focal zone 14. This maximises the gain of the lens 10.

It will be apparent to persons familiar with optical devices that the lens of FIG. 1 has a magnification of 1, for the slats of the lens are all parallel to the lens axis 11. Thus a ray from the source 13 which makes an angle $\alpha$ to the lens axis will be reflected once by a slat of the lens and the reflected ray will also make an angle $\alpha$ with the lens axis 11.

FIG. 1 illustrates an ideal construction for a slatted lens with a magnification of 1, with a progressive change in the front-to-back length, t, of the slats as the distance of the slat from the lens axis increases. In practice, when many slats are to be incorporated into the lens, the lens construction shown in FIG. 2 will normally be adopted.

Figure 2:
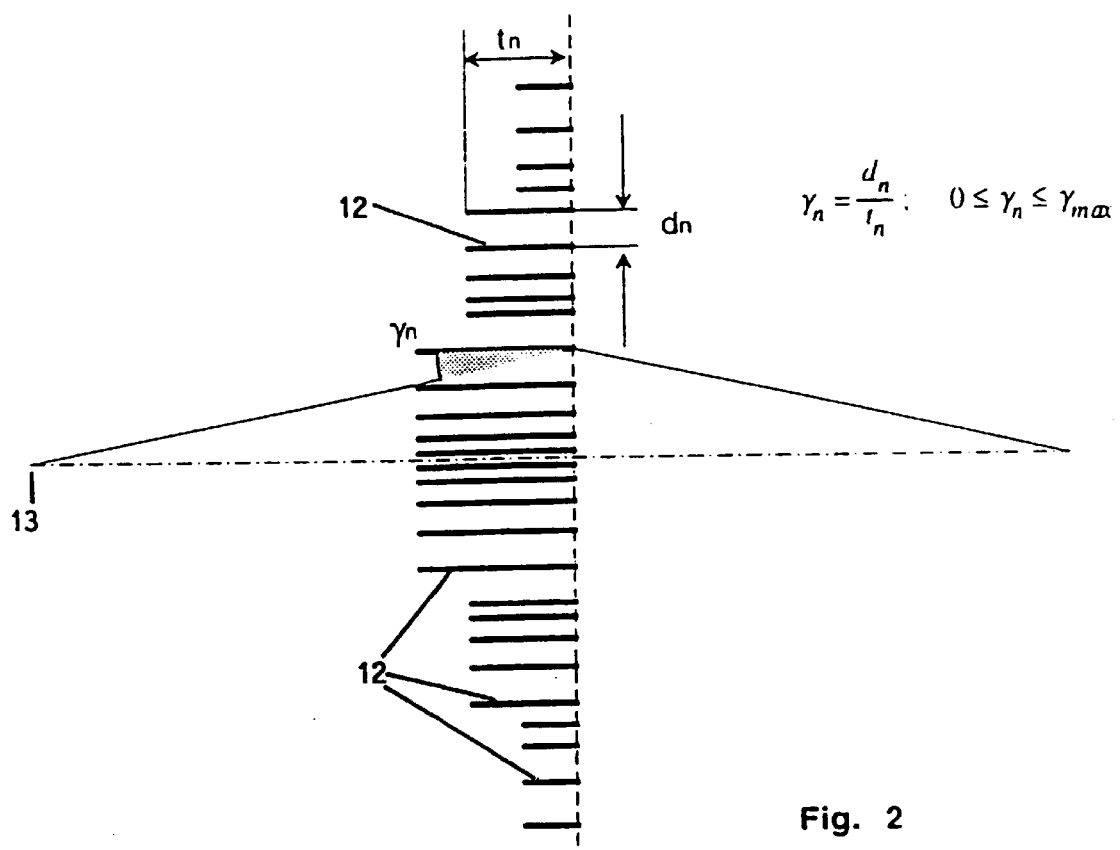
FIG. 2 is a schematic representation of a modified form of the lens of FIG. 1.

The lens shown schematically in FIG. 2 requires slats of three sizes only. The slats are mounted in groups of identical slats. However, the spacing between the slats of each group is varied progressively so that (as in the lens of FIG. 1) if the angle of incidence of radiation from the source 13 on the nth slat from the lens axis is $\gamma_n$ (in practice, because there are many more reflective slats 12 in a practical realisation of the lens shown in FIGS. 1 and 2, the angle $\gamma_n$ will not vary significantly over the reflective surface of the nth slat), the ratio $d_n/t_n$ is defined by the relationship:

$$\frac{d_n}{t_n} = \frac{\gamma_n}{2}\left(1 + \frac{1}{M}\right)$$

where $d_n$ is the separation (or spacing) between the nth and (n+1)th slats of the lens, and $t_n$ is the extent of the nth slat in a direction parallel to the lens axis 11.

The lens 20 shown in FIG. 3 is another modified form of the lens of FIG. 1. The main modification in this case is the inclination of the planar surfaces of the slats 22 relative to the lens axis 21. For radiation from the source 13, this results in a reduction of the size of the focal zone 24, and a consequential increase in the gain and in the magnification of the lens 20. Clearly, if the source of radiation should be located at 24, and the image produced at 13, the lens would have a magnification of less than 1, although it would still have a high gain.

Figure 4A:
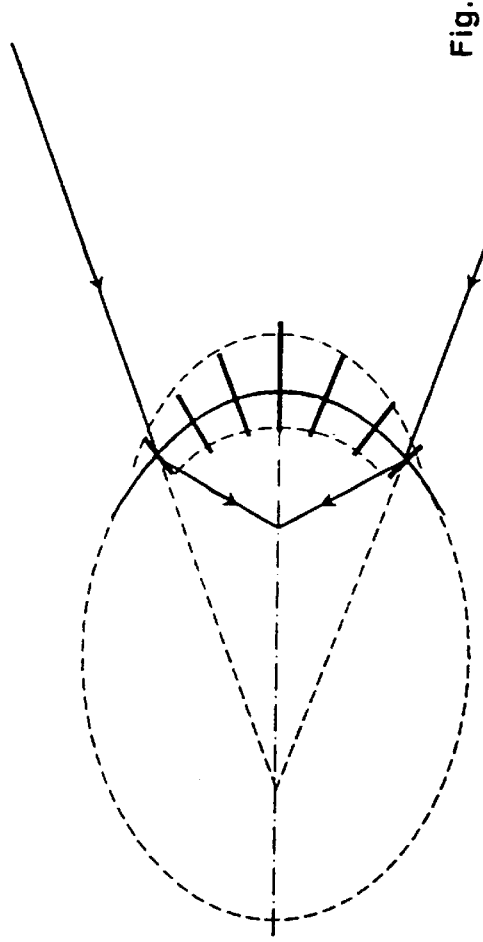
FIG. 4(a) is a representation, similar to that of FIG. 3, of another modified form of the lens to focus parallel beams, in which the generatrix (i.e. a line normal to each of the reflectors) of a lens with plane reflectors (as in FIG. 3) is a parabola.
Figure 4B:
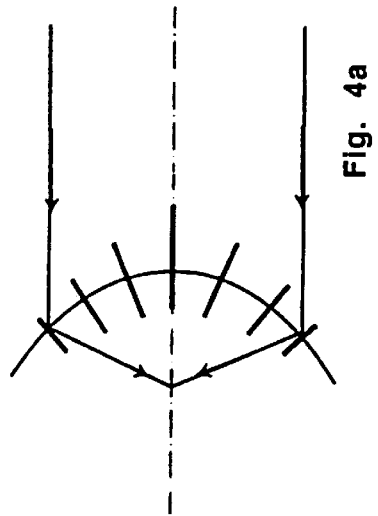
FIG. 4(b) is a representation of another modified form of the lens to focus converging beams, in which the generatrix of the lens with plane reflectors is of elliptical shape.
Figure 4C:
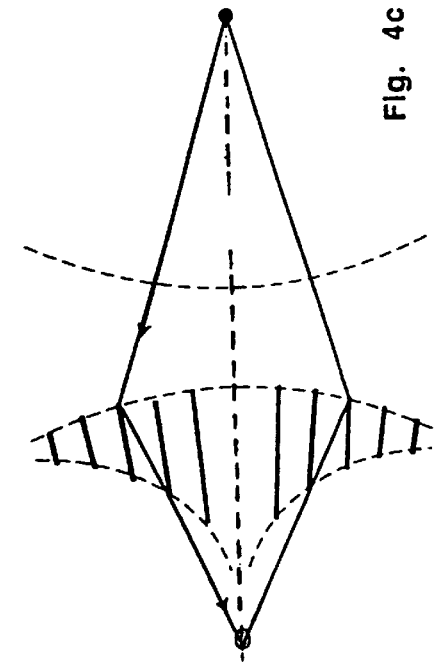
FIG. 4(c) is a representation, of another modified form of the lens to focus diverging beams, in which the generatrix of the lens with a plane reflectors is a hyperbola.
Figure 4D:
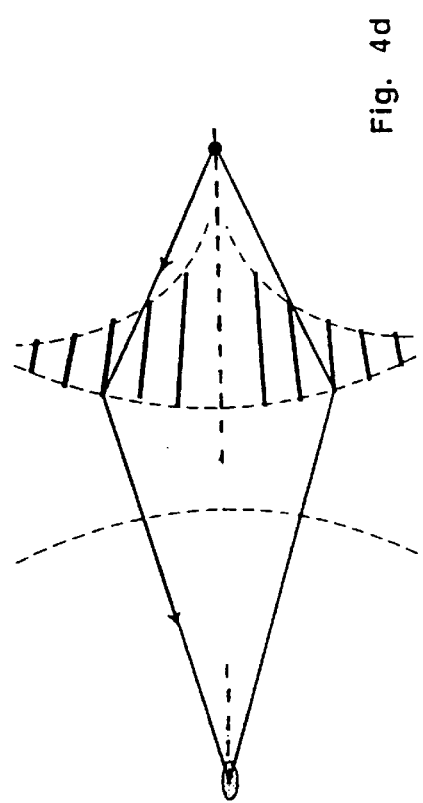
FIG. 4(d) is a representation of another modified form of the lens for magnification, in which the generatrix of the lens with plane reflectors is of concave hyperbolic shape.

FIG. 4 shows, in FIGS. 4(a) to 4(d), representations of arrays, each having a differently shaped generatrix. The generatrix is defined to be the line normal to each of the reflectors. Each of FIGS. 4(a) to 4(d) display lenses with plane reflectors or slats. FIG. 4(a) shows an array wherein the generatrix of the lens is of parabolic shape, to focus a parallel beam, or to produce a collimated beam from a point source. FIG. 4(b) shows an array wherein the generatrix of the lens is of elliptical shape, to focus a converging beam or to produce a diverging beam from a point source. The generatrix of the lens should be of hyperbolic shape to focus a diverging beam. It should be convex hyperbolic, as shown in FIG. 4(c) to achieve a high intensity gain in the focal spot, that is, demagnification, and, it should be concave hyperbolic for magnification, as shown in FIG. 4(d). In narrow angle lenses, the generatrix may have the a parabolic, hyperbolic or elliptic shape, which all approximate closely to a circle for small off-axis angles.

FIG. 5 illustrates a convenient mechanism for constructing lenses of the type shown in, FIGS. 1, 3 and 4, when the lenses are to be used with electromagnetic radiation, such as in the visible spectrum or with ultra-violet radiation or infra-red radiation.

The lens of FIG. 5 is constructed of optical quality material which is transparent to the radiation with which the lens is to be used. The transparent material must have a refractive index, n, for that radiation, which is greater than 1.

For radiation in the visible spectrum, a number of plastic materials and glasses can be used in this form of lens construction. Slots 80 are cut into a block of the transparent material having the required shape of the slatted lens to be produced. The slots 80 are made at the locations of the slats of the required slatted lens. The slot face which is closest to the axis of the lens must be polished to ensure good lens performance, and for some applications, each face of the slots should be polished (this means that for a lens which is equivalent to a lens having planar slats, the slot faces will be optically flat). The slots 80 need not extend completely through the block of plastic. The front faces 85 and the rear faces 86 of the transparent material between the slots must be optically flat faces for good lens performance.

FIG. 5 includes several ray paths from a point source 13 on the lens axis. It will be noted that each off-axis ray is refracted when it strikes the front surface 85 of the optical quality transparent material, and then is reflected (by total internal reflection) from the face of the relevant slot 80, before being refracted again at face 86 on leaving the transparent material of the lens.

It will be appreciated that slatted lenses, forming arrays of other shapes (such as the lenses shown in FIG. 4) may be constructed in this manner, or, by assembling a series of blocks of the optical quality transparent material having (i) a refractive index greater than 1 and (ii) polished surfaces having the required slat shape. Each of the assembled blocks will be spaced from its adjacent block or blocks by a small distance.

Figure 6:
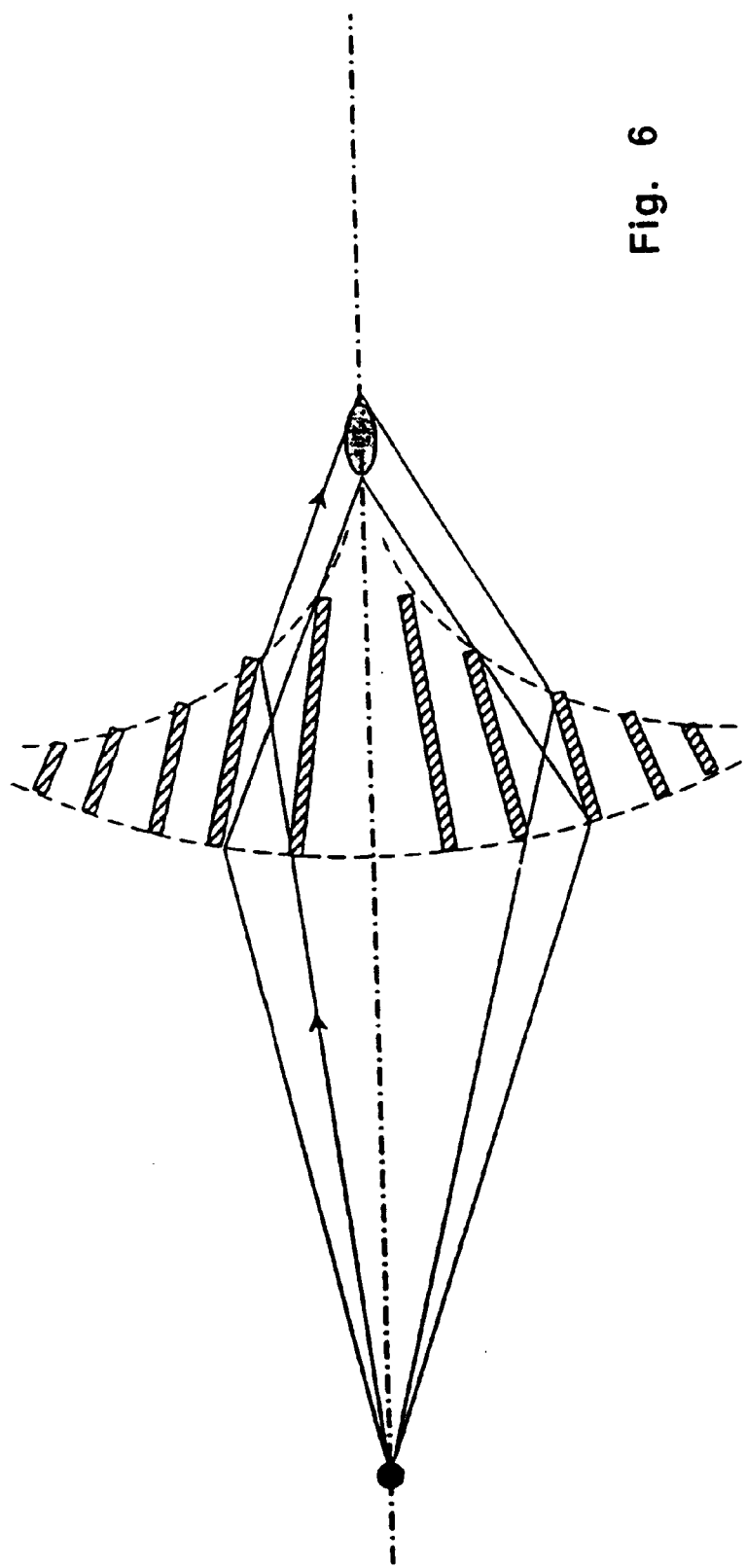
FIG. 6 illustrates a lens to focus X-rays similar to that in FIG. 3, but wherein the reflectors are crystals or multi-layer mirrors, and reflection is due to Bragg reflection.
Figure 7A:
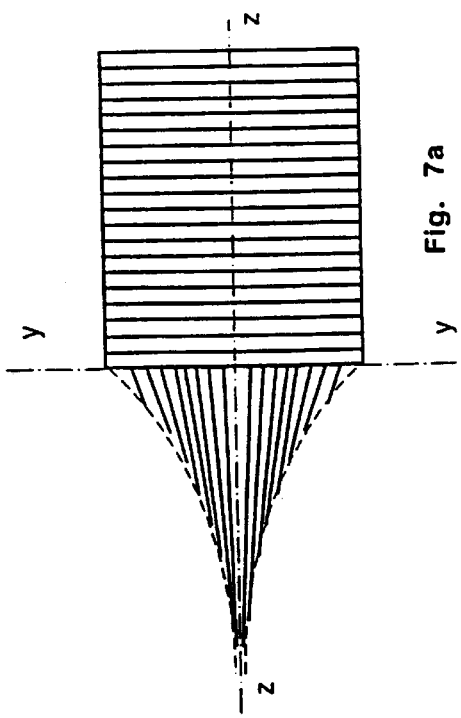
FIG. 7 illustrates an improved 90° crossed-slats lens formed by two one-dimensional slatted lenses of the types featured in FIGS. 1 to 3 crossed at right angles, various views being shown in FIGS. 7(a) to 7(d)
Figure 7B:
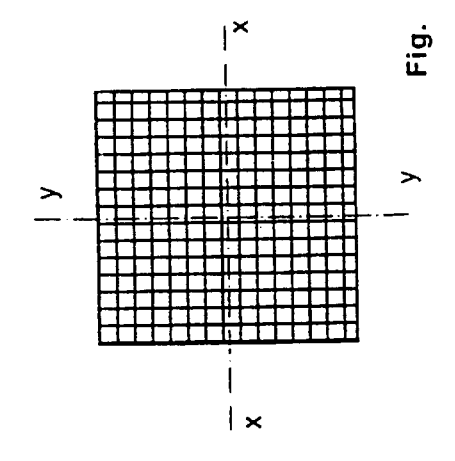
Figure 7C:
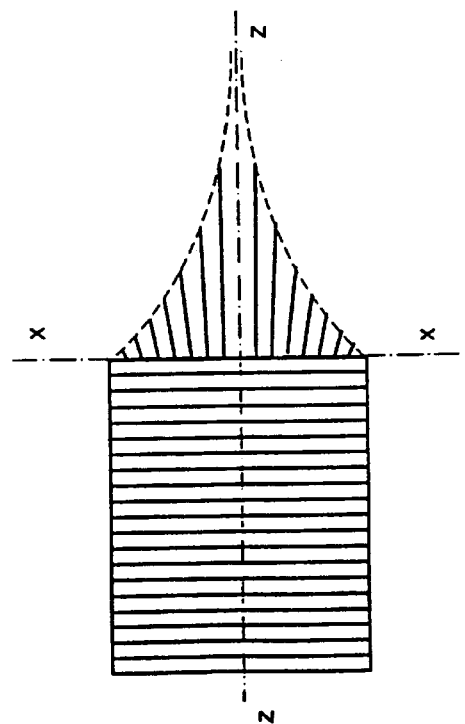
Figure 7D:
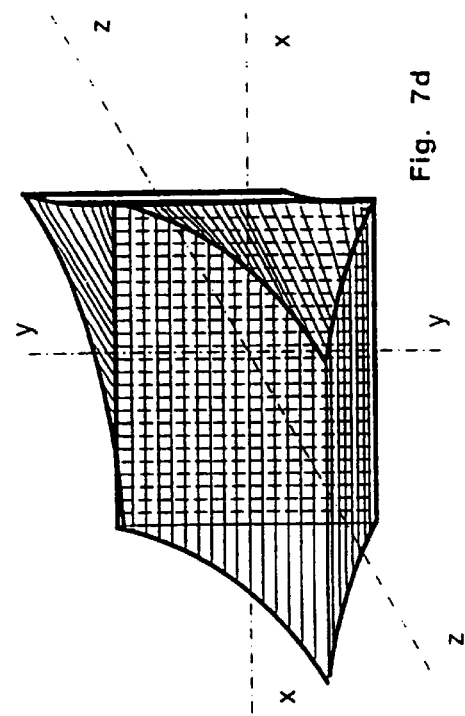

FIG. 6 illustrates a lens to focus X-rays similar to that in FIG. 3, but wherein the reflectors are crystals or multi-layer mirrors, and reflection is Bragg reflection.

Various practical applications for the present invention are envisaged by the inventor, as will be described hereafter.

(i) UV, VUV and X-Ray lenses and collimators with high efficiency.

It has been shown that the collection efficiencies of square-channel optics can be increased by modifying the lens structure. Such modifications involve segmenting the plate, or varying channel width, or locally varying the lens thickness.

FIG. 7 is an illustrative example of a 90° crossed-slats lens 60 which is constructed using two lenses of the type shown in FIG. 3, the two lenses having a common centre of curvature. Such a 90° crossed-slats lens 60 acts to focus incident radiation from a point source to a focal zone. FIG. 7(a) shows an elevational view in the y-z plane, FIG. 7(b) shows a top view (x-y plane), FIG. 7(c) shows an elevational view in the x-z plane, and FIG. 7(d) illustrates a three dimensional representation of the lens.

A focusing efficiency approaching 100% can be achieved for such a lens with each channel length $t_n$ and channel width $d_n$, varying as:

$$\frac{d_n}{t_n} = \frac{\gamma_n}{2}\left(1 + \frac{1}{M}\right)$$

where $\gamma_n$ is the angle between the n-th reflector and the ray entering the n-th channel.

The focus will be square with a width M+1 times the maximum channel width $d_n$. Therefore to achieve tight focusing and high intensity gain it is worthwhile to vary $t_n$ to satisfy the above condition. 100% efficiency is achieved only for one particular set of source and image distances.

(ii) A UV, VUV and X-ray Beam Homogeniser.

FIG. 8 shows an example of a double array lens designed as a UV, VUV and X-ray beam profile homogeniser to arrange a Gaussian beam into a 'top hat' beam, fir material processing. The requirements are that the surface of the material should be illuminated as uniformly as possible or shaped for intensity according to particular production requirements. An array of optical devices with the ability to manipulate a beam shape has a unique potential to develop a low-cost beam homogeniser with minimal power loss. One of the possible schemes to convert a collimated beam with Gaussian profile in intensity distribution into a focusing beam with homogeneous intensity in a particular sample plane is shown in FIG. 8. The first lens is a beam expander (convex parabolic, if the beam is collimated, or hyperbolic in case of diverging beam) and the second is a focusing lens (hyperbolic). To design such a beam homogeniser, it is necessary to take into account the initial beam divergence, near-field distribution, diffraction effects on reflector edges, and the actual beam size to develop the required intensity distribution over the sample.

(iii) Sky light enhancer made of an array of reflectors.

Figure 9A:
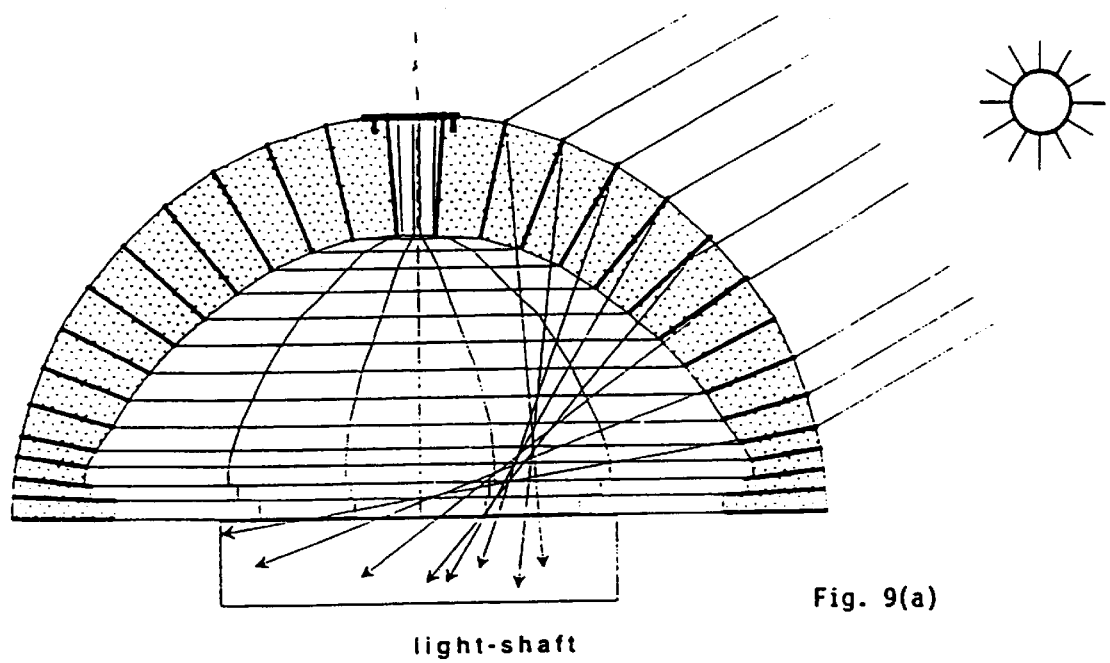
FIG. 9 illustrates a practical application of a lens constructed in accordance with the present invention, embodied as a 2-D sky light enhancer made of blocks of transparent plastics material with slots or reflectors for total internal reflections, FIG. 9(a) showing an elevational cross-sectional view thereof, and FIG. 9(b) showing a top view thereof.
Figure 9B:
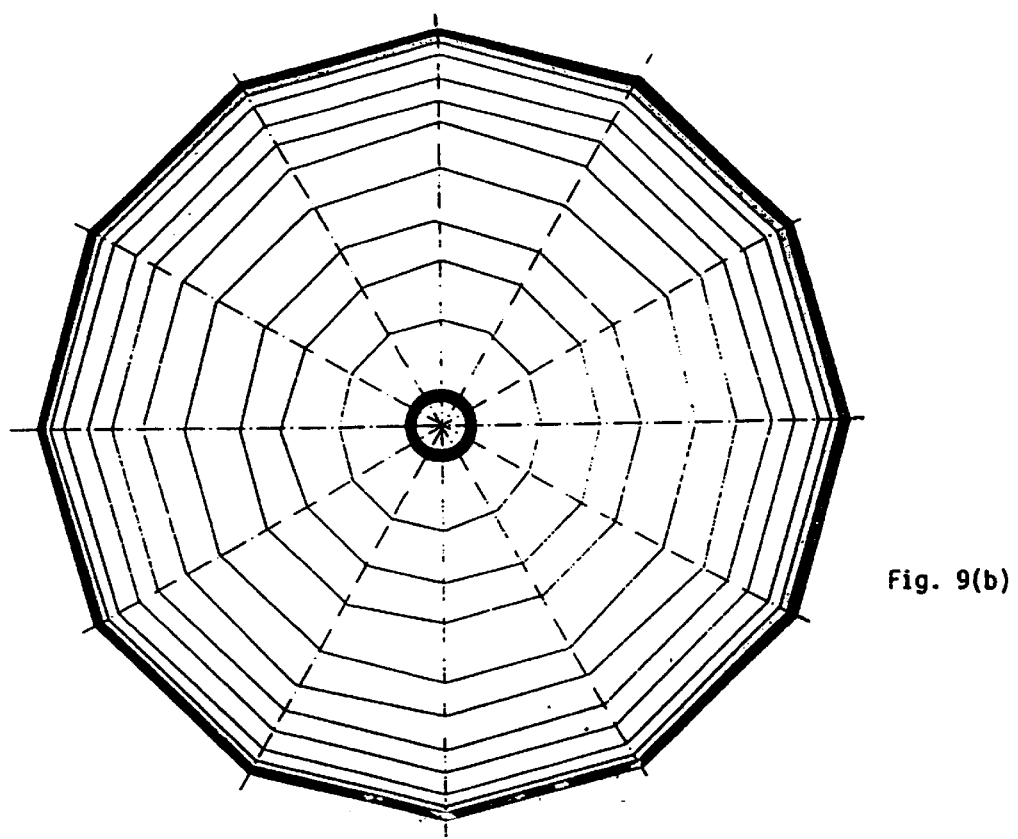

FIG. 9 shows, in FIGS. 9(a) and 9(b), elevational cross-sectional and top views, respectively of a practical application of the arrays of the present invention embodied as a two dimensional sky-light enhancer made of blocks of transparent material, formed of plastics or other material, with slots as reflectors for total internal reflection. A similar configuration could be constructed utilising 'normal' reflectors.

(iv) Elliptical and Hyperbolic array of reflectors for Solar concentrators

Figure 10:
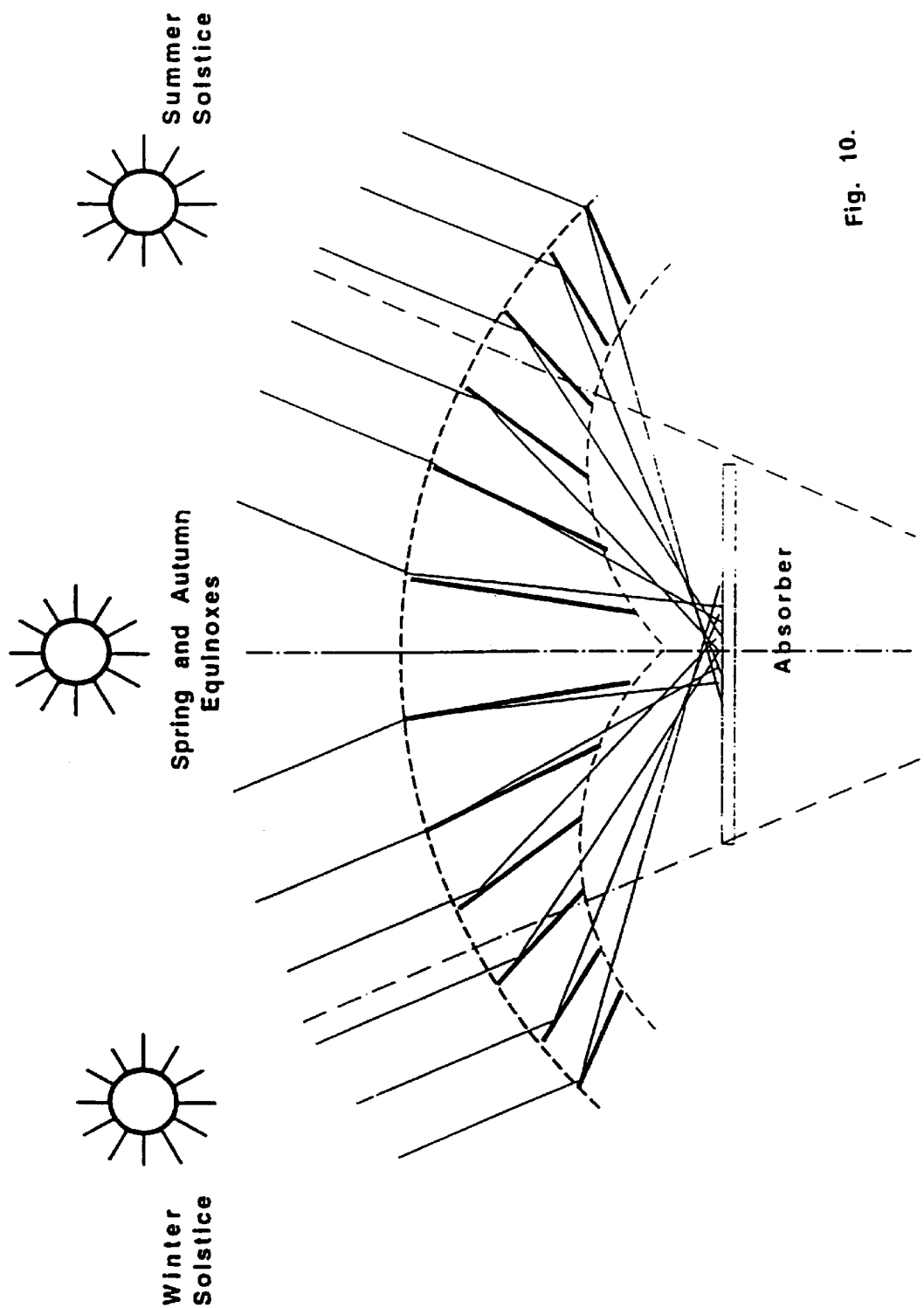
FIG. 10 illustrates an elevational cross-sectional view of a trough-like solar concentrator formed by an array of reflectors which may be formed of parabolic, hyperbolic and/or elliptical shape.

FIG. 10 shows a cross-sectional view of a trough-like solar concentrator, being another practical application of the present invention. The solar concentrator may be made as an array of reflectors with parabolic, hyperbolic or elliptical shape.

(v) Compound hyperbolic concentrators

FIG. 11(a) represents an example of an array design as a compound parabolic concentrator. It consists of the right and the left halves which belong to different parabolas, where each parabola focuses the radiation as a parallel beam to the axes of each parabola axis into focal points, both on the absorber. The goal of this design is to maximise the concentration of radiation coming from different angles. The solution is to increase the slope of the axis of the parabolic curve so that extreme rays within the acceptance angle illuminate the absorber within the prescribed dimensions.

FIG. 11(b) represents an example of an array design as a compound hyperbolic concentrator. It consists of the right and the left halves which belong to different hyperbolas, where each hyperbola focuses the radiation coming within the acceptance angle into a focal point. The goal of this design is to maximise the concentration of radiation coming within the aperture of the concentrator. The solution is to increase the distance between the axis of the hyperbolic curves so that extreme parallel rays illuminated the absorber within the prescribed dimensions.

It is emphasised that the embodiments of the present invention which are illustrated in the accompanying drawings and described above are only examples of the present invention. Variations of and modifications to the illustrated lenses may be made without departing from the present inventive concept.

I claim:

1. A lens, suitable for directing radiation, comprising an array of planar reflecting elements, wherein each of said elements are of non-uniform extent or surface area and/or are non-uniformly spaced from adjacent elements, and wherein the ratio of $d_n/t_n$ is determined by angle of incidence $\gamma_n$ of radiation on each element of said lens as is given by the relationship:

$$\frac{d_n}{t_n} \simeq \gamma_n$$

where $d_n$ is the spacing between the nth and (n+1)th adjacent elements of the lens, and $t_n$ is the length of the nth element.

2. A lens as claimed in claim 1, wherein the ratio of $d_n/t_n$ is determined by angle of incidence $\gamma_n$ of radiation on each element of said lens as is given by the relationship:

$$\frac{d_n}{t_n} = \frac{\gamma_n}{2}\left(1 + \frac{1}{M}\right)$$

where $d_n$ is the spacing between the nth and (n+1)th adjacent elements of the lens, $t_n$ is the length of the nth element, and M is the magnification of the lens.

3. A lens as claimed in claim 1, wherein the extent of each of said elements decreases or remains the same relative to adjacent elements, as the distance of each of said elements from an axis of said lens increases.

4. A lens as claimed in claim 1, wherein the spacing between adjacent elements increases as the distance of each element from the axis of said lens increases, whilst the extent of each element remains the same.

5. A lens as claimed in claim 1, wherein the elements are designed and positioned to minimize shadowing on other elements.

6. A lens as claimed in claim 1, wherein either one or both faces of each of said elements is provided with a reflective surface.

7. A lens as claimed in claim 1, wherein the generatrix of the lens is of simple or compound, hyperbolic, parabolic, elliptical or circular shape.

8. A cross-slatted lens, formed of two lenses as claimed in claim 1, wherein their respective elements are placed with their edges closely adjacent to each other and with their elements crossed at 90°.

9. A lens as claimed in claim 1, wherein said reflective elements are formed as planar slots in transparent material and whereby reflection is due to total internal reflection.

10. A lens as claimed in claim 1, wherein said reflective elements are crystals or multi-layer mirrors and reflection is due to Bragg reflection.

11. A double array lens comprised of two lenses as claimed in claim 1, wherein said double array lens is used as a beam profile homogenizer to arrange a first type of beam into a second type of beam.

12. A lens as claimed in claim 1, wherein said lens is utilized as a sky-light enhancer.

13. A lens as claimed in claim 1, wherein said lens is utilized as a solar concentrator.

14. A cross-slatted lens formed of two lenses as claimed in claim 1, wherein their respective elements are placed with their edges abutting each other and with their elements crossed at 90°.

* * * * *